Figure 1:
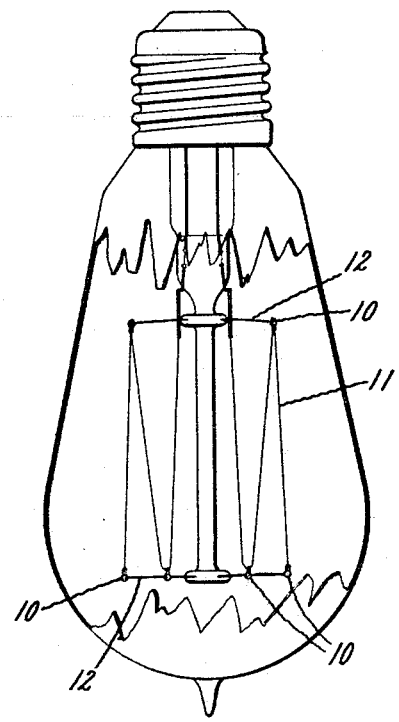

F. M. DORSEY & H. D. BLAKE.
INCANDESCENT LAMP.
APPLICATION FILED FEB. 5, 1914.

1,250,815.

Patented Dec. 18, 1917.

Witnesses:
Helen Oxford
Benjamin B. Hull

Inventors:
Frank M. Dorsey,
Harold D. Blake,
by: Albert G. Davis
Their Attorney.

UNITED STATES PATENT OFFICE.

FRANK M. DORSEY AND HAROLD D. BLAKE, OF CLEVELAND, OHIO, ASSIGNORS TO GENERAL ELECTRIC COMPANY, A CORPORATION OF NEW YORK.

INCANDESCENT LAMP.

1,250,815.   Specification of Letters Patent.   Patented Dec. 18, 1917.

Application filed February 5, 1914. Serial No. 816,668.

*To all whom it may concern:*

Be it known that we, FRANK M. DORSEY and HAROLD D. BLAKE, citizens of the United States, residing at Cleveland, in the county of Cuyahoga, State of Ohio, have invented certain new and useful Improvements in Incandescent Lamps, of which the following is a specification.

Our invention relates to incandescent lamps in which the filament is composed of tungsten or like metal. More specifically, our invention relates to means for maintaining the candle power and increasing the efficiency of lamps of this character. Various chemicals known as getters have been placed in the bulbs of incandescent lamps for this purpose. Our invention comprises a new getter having many advantages, as will appear from the detailed description which follows.

We have found that phosphorus in the solid form associated with a substance which will readily give up oxygen to phosphorus at the operating temperature of the lamp is very effective in increasing the efficiency of metal filament lamps. Certain metallic oxids such as cupric oxid we have found to be especially adapted for use in this connection. As to the chemical action which takes place when a mixture of this kind is used in an incandescent lamp, it may be that at the operating temperature of the lamp the phosphorus combines with a portion of the cupric oxid to form an oxid or oxids of phosphorus and cuprous oxid. However, we do not wish to be confined to any particular theory of operation. Certain oxids of phosphorus, for example, phosphoric pentoxid, have considerable affinity for water vapor and the vapors given off during the life of the lamp. This action would be highly effective in maintaining the candle power of the lamp, since it would obviate the injurious effect of water vapor and at the same time combine with and neutralize to a considerable extent the effect of any vaporized metal or metallic compounds which might be developed in the bulb.

Another aspect of our invention is that a composition embodying our invention may be used in connection with incandescent lamps which have copper filament supporting hooks. With the getters which have been heretofore proposed it has been found desirable to use metals other than copper for supporting hooks, because of the chemical action between these getters and the copper or copper oxid with which copper hooks usually become covered during the manufacture of the lamp. Copper is a very desirable metal to use in connection with metal filaments, such as tungsten, because of the fact that the copper does not alloy with the tungsten and it is fairly cheap metal and can be easily worked. It is to be understood, however, that the composition comprising our invention is applicable also to lamps in which the filament supporting hooks are composed of other metals. In fact, exceptionally good results have been obtained with tungsten hooks.

One method which we have found efficacious in preparing our getter is to mix 100 parts, by weight, of cupric oxid, 2½ to 5 parts, by weight, of red phosphorus, and enough sodium silicate solution of specific gravity, 1.09 to 1.15, to form a suitable paste. In mixing it is very desirable, in order to obtain a uniform intermingling of the constituents, to first mix the phosphorus with the binder and to then add the cupric oxid. The cupric oxid should be free from salts such as sulfates and chlorids which are apt to be present in the ordinary commercial variety.

Instead of mixing the phosphorus and oxidizing agent such as copper oxid, the latter only with a binder may be placed in the lamp and phosphorus added by volatilizing it into the bulb in the manner disclosed in Malignani Patent No. 537,693, April 16, 1895. However, this procedure, while giving good results, is not considered to be as good as the direct mixing of the phosphorus and oxidizing agent.

Figure 2:
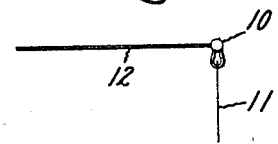

In the drawing is shown one way in which our invention may be applied to incandescent lamps. Figure 1 is an elevation partly broken away of such an incandescent lamp, and Fig. 2 is a detailed view on an enlarged scale of one of the supporting hooks with the getter in place.

The lumps of getter 10 are applied to the hooks 12, which support the filament 11. The hook serves to anchor the lump of getter securely in place. Owing to the fact that the getter is thus brought in close thermal contact with the filament, it is effectively heated during such time as the lamp is in use. By mounting a small lump of the getter on each of the supporting hooks an effective distribution throughout the bulb is obtained. By thus subdividing the material the results secured are much better than if the material were concentrated at a single or only a few points. However, it is to be understood that it is not essential to our invention that the getter be mounted in any particular way.

The sodium silicate hereinbefore referred to acts as a binder to hold the copper oxid and phosphorus mixture together and probably has no chemical action.

What we claim as new and desire to secure by Letters Patent of the United States, is:—

1. An electric incandescent lamp comprising a bulb, a metallic filament and a getter comprising phosphorus and a non-gaseous oxidizing agent within said bulb.

2. An electric incandescent lamp comprising a bulb, a tungsten filament and a getter comprising phosphorus and a non-gaseous oxidizing agent within said bulb.

3. An electric incandescent lamp comprising a bulb, a metallic filament and a getter comprising phosphorus and a copper oxid within said bulb.

4. An electric incandescent lamp comprising a bulb, a tungsten filament and a getter comprising phosphorus and a copper oxid within said bulb.

5. An electric incandescent lamp comprising a bulb, a tungsten filament and a getter comprising phosphorus and cupric oxid within the said bulb.

In witness whereof, we have hereunto set our hands this 2nd day of February, 1914.

FRANK M. DORSEY.
HAROLD D. BLAKE.

Witnesses:
J. H. ANDERSON,
CHAS. E. STROBEL.